(12) United States Patent
Bucher et al.

(10) Patent No.: US 6,720,520 B1
(45) Date of Patent: Apr. 13, 2004

(54) METHOD AND DEVICE FOR WELDING SHEETS

(75) Inventors: Romeo Bucher, Uhwiesen (CH); Bruno Kaegi, Bubikon (CH)

(73) Assignee: Elpatronic AG, Bergdietikon (CH)

( * ) Notice: Subject to any disclaimer, the term of this patent is extended or adjusted under 35 U.S.C. 154(b) by 0 days.

(21) Appl. No.: 09/913,984

(22) PCT Filed: Feb. 15, 2000

(86) PCT No.: PCT/CH00/00086

§ 371 (c)(1),
(2), (4) Date: Dec. 27, 2001

(87) PCT Pub. No.: WO00/53366

PCT Pub. Date: Sep. 14, 2000

(30) Foreign Application Priority Data

Mar. 8, 1999 (CH) ................................................. 423/99

(51) Int. Cl.[7] .............................................. B23K 26/00
(52) U.S. Cl. ................................................. 219/121.64
(58) Field of Search ....................... 219/121.64, 121.63, 219/121.73, 121.74, 121.75, 121.83; 228/173.3, 173.6, 173.1, 170, 171

(56) References Cited

U.S. PATENT DOCUMENTS

| | | | |
|---|---|---|---|
| 5,343,010 A | * | 8/1994 | Urech .......................... 219/83 |
| 6,031,199 A | | 2/2000 | Ream et al. |
| 6,060,682 A | * | 5/2000 | Westbroek et al. ..... 219/121.64 |
| 6,204,469 B1 | * | 3/2001 | Fields et al. ............. 219/121.6 |
| 6,211,483 B1 | * | 4/2001 | Bishop .................. 219/121.63 |
| 6,288,361 B1 | * | 9/2001 | Pircher et al. ......... 219/121.73 |
| 6,479,786 B1 | * | 11/2002 | Fields et al. ........... 219/121.63 |
| 6,590,180 B1 | * | 7/2003 | Suh et al. .............. 219/121.63 |
| 6,601,909 B2 | * | 8/2003 | Obara et al. ................ 296/191 |

FOREIGN PATENT DOCUMENTS

FR          2196218          3/1974

* cited by examiner

Primary Examiner—Tom Dunn
Assistant Examiner—Jonathan Johnson
(74) Attorney, Agent, or Firm—McCormick, Paulding & Huber LLP

(57) ABSTRACT

A method for welding a pair of metal sheets together along an edge of each metal sheet is provided that includes the steps of: 1) determining a line for each of the edges to be welded using one or more sensors: 2) selecting one of the edges to be welded as a dominant edge and the other edge to be welded as a non-dominant edge: and 3) welding the metal sheets together along the dominant edge and the non-dominant edge. The present invention further includes an apparatus capable of performing the present method.

7 Claims, 1 Drawing Sheet

METHOD AND DEVICE FOR WELDING SHEETS

This application claims the benefit under 35 U.S.C. §120 of the PCT patent application serial number PCT/CH00/00086 filed on Feb. 15, 2000.

BACKGROUND OF THE INVENTION

1. Technical Field

The invention relates to a method and an apparatus for welding sheets of metal in general, and to methods and apparatus for welding sheets of metal that sense the edges of the sheets of metal along which the sheets are to he welded, in particular.

2. Background Information

It is known to weld so-called tailored blanks, which are then formed into a formed body, from metal sheets which as a rule have dissimilar properties (e.g. thickness, material). Such formed bodies are used e.g. in the motor vehicle industry. Welding of the tailored blanks is performed by, for example, laser or electron-beam welding. In the case of laser-beam welding, in order to obtain a weld seam of sound quality that is fit for the subsequent forming process it is necessary that the sheets when positioned with their edges butted together should have a very small gap between them. This gap should not exceed, for example, 0.08 mm so that welding with a focused laser beam of 0.2 mm diameter can be carried out without any problem. However, when the individual sheet-metal parts are sheared or punched, errors may occur and/or sheets may be distorted because of internal stresses, preventing a gap dimension of 0.08 mm between the sheets from being adhered to. Touching up the edges of all sheets in the course of their fabrication is expensive. Also it is undesirable for space and handling reasons to have to arrange separate machining stations in front of the welding unit. The fundamental problem of the invention, therefore, is to provide a welding method and apparatus for tailored blanks that allow trouble-free welding without the stated drawbacks.

DISCLOSURE OF THE INVENTION

According to the present invention, a method for welding a pair of metal sheets together along an edge of each metal sheet is provided that includes the steps of 1) determining a line for each of the edges to be welded using one or more sensors: 2) selecting one of the edges to be welded as a dominant edge and the other edge to be welded as a non-dominant edge: and 3) welding the metal sheets together along the dominant edge and the non-dominant edge. The present invention further includes an apparatus capable of performing the present method.

Detecting the edge line of both sheets and selecting one of the edges as a datum edge means that only one of the edges need be machined, and the control device can select the dominant or datum edge in such a way that the machining cost is kept as low as possible. The result is a pairing of the sheets in the welding machine, so that a separate machining station is not needed.

In a preferred embodiment, the sheets are not paired off if the edge lines of the two sheets are so different that the machining cost would be excessive. In this case, one of the sheets is discarded and replaced with another. Depending on its edge line, the discarded sheet may be taken out of the production process altogether, or returned to a sheet stack from which it will later be fed to the welding machine again, along with another sheet.

These and other objects, features and advantages of the present invention will become apparent in light of the Detailed Description of the Invention, and the accompanying drawing.

BRIEF DESCRIPTION OF THE DRAWING

Embodiments of the invention will now be described in detail by way of example, with reference to FIG. 1, which schematically shows a welding apparatus for carrying out the present method.

DETAILED DESCRIPTION OF THE INVENTION

Figure 1:
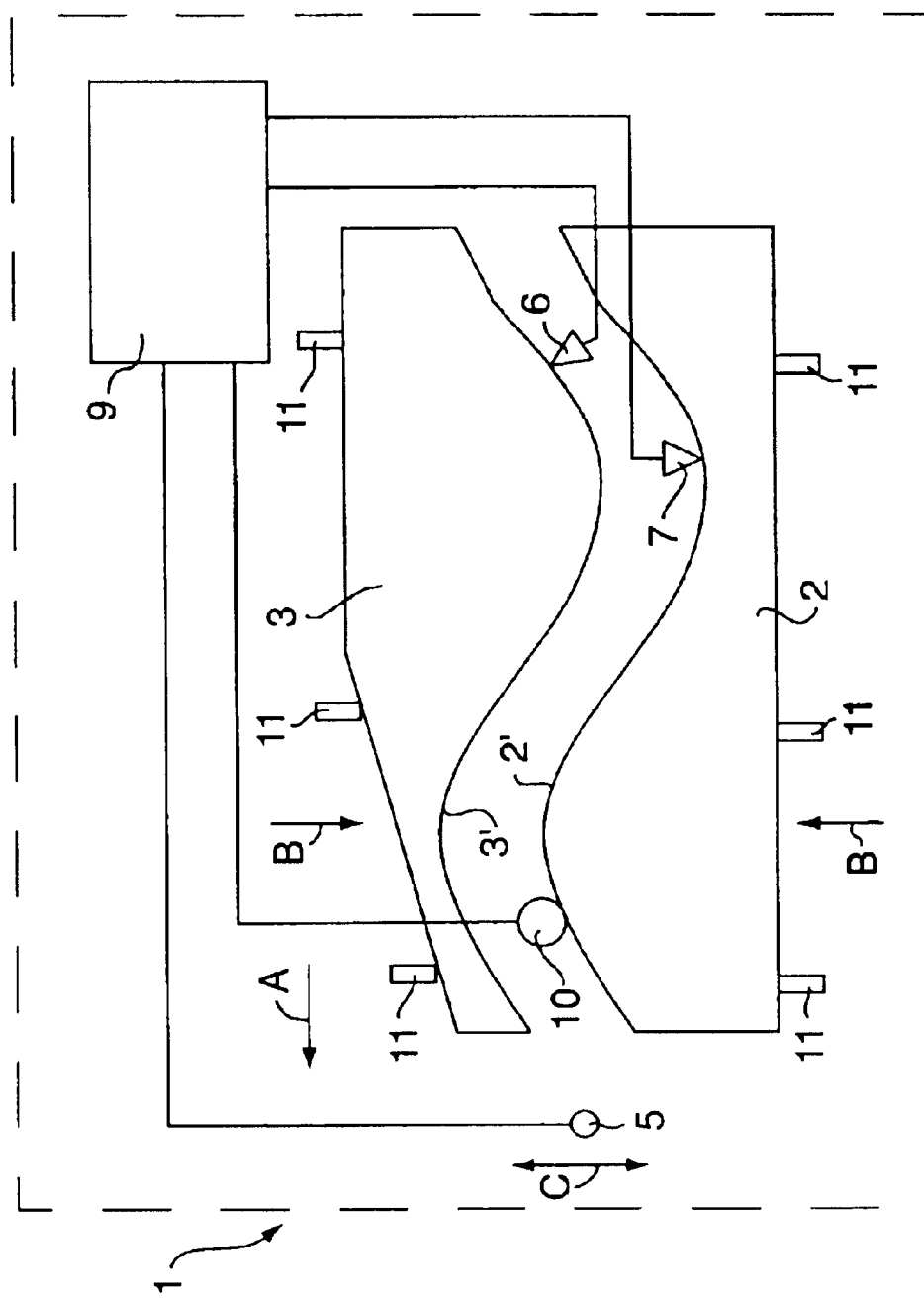

FIG. 1 schematically shows a welding apparatus 1 in which two sheets 2 and 3 to be welded together by means of a laser beam 5 are arranged. In the position shown, the sheets are held with their welding edges 2' and 3' spaced apart from one another prior to entry into the welding zone. The sheets are lying on a conveyor device (not shown) by means of which they can he carried through the welding zone in the direction shown by arrow A. Laterally the sheets arc held by guides 11. In the spaced-apart position shown, each sheet edge 2' and 3' can be tracked by a sensor 6, 7 to detect its precise line. Instead of two sensors, it would also be possible to provide a single sensor which would sense first one edge and then the other. Instead of a mechanical sensor, an optical edge-line detecting system, or one based on some other sensing principle, could be provided. The sensors 6, 7 are guided along the respective edges by traversing means which is not shown, and signal the line of the respective edges to a control unit 9. The control unit 9 records the precise lines of the two edges, and compares them with each other. The control unit 9 is able to determine from the line of the edges whether the gap will be within the permissible maximum when the edges are brought together for welding. If this is confirmed to be the case, the two sheets can be pressed together, without further reworking, by the guides 11, which move in the direction shown by the arrows B, and in this abutting position the two sheets are traversed in the direction of the arrow A and welded under the laser beam 5, which impinges on the gap from above or from below. If the line of the edges 2' and 3' is other than straight (e.g., as shown in FIG. 1), the laser beam is made to track the gap by displacement in the direction shown by arrow C. In this case, the control unit for the laser beam 5, which may be the control unit 9 or a separate control unit connected to the control unit 9, may use the edge line detected by means of the sensors as the basis for controlling the laser beam 5. This control based upon the actual line of the edge or gap may replace or supplement the optical gap detection which has normally been used hitherto.

If, however, the control unit 9 finds, at the edge detection stage, that the gap cannot be kept within the permissible maximum if the edges 2' and 3' are joined together in their existing from, the control unit 9 identities one of the edges as the dominant or datum edge, and controls the adjustment of the other edge by a machining tool 10 to match it to the datum edge. The datum 8 is chosen so as to incur the smallest possible amount of machining for the other edge. The machining tool provided may be, for example, a roller 10 which presses on the edge to be machined so that the edge yields under pressure and is deformed accordingly. In this case the machining tool 10 may be displaced along the edge, applying varying pressure thereto. The corresponding mechanical, pneumatic or hydraulic actuating device for the roller 10 is not shown in the figure. Pressing with a roller is the preferred method of machining, as it produces no swarf, and the squeezing of the affected sheet edge does not hinder, and may possibly even assist, the welding process. On its own, pressing can produce an alteration to the edge line of around 1/10 mm. which is sufficient for the present purpose. Nevertheless, other known machining methods, such as milling or grinding for example may also be used. When the machined edge has been matched to the datum edge, the machining tool 10 can be withdrawn, and the two sheets are, as before, pressed together by the positioning means 11 in the direction shown by arrows B, and led by the conveyor means under the laser beam 5 in the direction shown by arrow A. In this case also, the movements of the laser can be controlled on the basis of the edge data.

If, after recording the lines of the two edges, the control device 9 finds that machining the two sheets with the tool 10 would fail to bring them sufficiently into register within a specified time, for the permissible gap to be adhered to, machining is not initiated, and one sheet is discarded. This can be done by running one sheet out of the welding machine in the direction shown by arrow A, or in the opposite direction or sideways from the welding machine. The discarded sheet can be scrapped if the position of its edge lies outside a specified maximum deviation from a required edge position. If this is not the case, then the discarded sheet can be conveyed back to a sheet stack from which it will later again pass into the welding machine, along with another sheet. In this case, the combination of the two edge lines may result in a pairing whereby the permissible gap can be comfortably adhered to.

The method and apparatus which have been indicated permit simple and rapid pairing of sheets for the fabrication of tailored blanks in the welding machine. The method is especially preferred where the gap, or the line of the weld seam, is not straight.

Although this invention has been shown and described with respect to the detailed embodiments thereof, it will he understood by those skilled in the art that various changes in form and detail thereof may be made without departing from the spirit and the scope of the invention.

What is claimed is:

1. A method for welding metal sheets to form tailored blanks, comprising:

detecting the edge line of both sheets in the welding machine;

identifying the edge line of one of the sheets as the dominant edge line;

reworking the other edge to match it to the dominant edge; and then welding the sheet.

2. A method for welding a pair of metal sheets together along an edge of each metal sheet, comprising the steps of:

sensing the edge to be welded of each metal sheet;

determining a line for each of the edges to be welded;

selecting one of the edges to be welded as a dominant edge, and the other edge to be welded as a non-dominant edge;

reworking the non-dominant edge to substantially match the dominant edge;

welding the metal sheets together along the dominant edge and the non-dominant edge.

3. The method of claim 2, further comprising the step of discarding the metal sheet with the non-dominant edge if the line determined for the non-dominant edge deviates more than a predetermined amount.

4. The method of claim 2 wherein the step of reworking the non-dominant edge to substantially match the dominant edge includes machining the non-dominant edge.

5. The method of claim 4, wherein the machining includes pressing with a pressing tool.

6. The method of claim 2 wherein the step of welding the metal sheet together along the dominant edge and the non-dominant edge includes guiding a welding beam at least in part based upon the line of the dominant edge.

7. A method for welding a pair of metal sheets together along an edge of each metal sheet, comprising the steps of:

determining a line for each of the edges to be welded using one or more sensors;

selecting one of the edges to be welded as a dominant edge, and the other edge to be welded as a non-dominant edge;

determining if a gap between the edges to be welded exceeds a predetermined amount;

replacing the metal sheet having the non-dominant edge with a replacement metal sheet;

determining a line for the edge of the replacement sheet to be welded and repeating the step of determining a gap and also the step of replacing the metal sheet having the non-dominant edge, if necessary, until the gap is equal to or less than the predetermined amount;

welding the metal sheets together along the dominant edge and the non-dominant edge.

* * * * *